United States Patent

Olszewski et al.

[11] Patent Number: 4,664,647
[45] Date of Patent: May 12, 1987

[54] BELT PULLEY FOR A BELT DRIVE

[75] Inventors: Jerzy D. Olszewski; Jan D. Olszewski, both of Bonn, Fed. Rep. of Germany

[73] Assignee: Kloeckner-Humboldt-Deutz AG, Cologne, Fed. Rep. of Germany

[21] Appl. No.: 861,155

[22] Filed: May 8, 1986

[30] Foreign Application Priority Data

May 14, 1985 [DE] Fed. Rep. of Germany ....... 3517391

[51] Int. Cl.$^4$ .............................................. F16H 55/49
[52] U.S. Cl. ..................................... 474/174; 474/166
[58] Field of Search .......................... 474/160, 174–183

[56] References Cited

U.S. PATENT DOCUMENTS

| 620,478 | 2/1899 | Mittirger, Jr. | 474/174 |
| 782,253 | 2/1905 | Lachman | 474/180 |
| 3,776,059 | 12/1973 | Habermann | 474/181 |
| 4,227,423 | 10/1980 | Crowe | 474/177 |

FOREIGN PATENT DOCUMENTS

| 0010874 | of 1903 | United Kingdom | 474/175 |
| 3360 | of 1910 | United Kingdom | 474/178 |

Primary Examiner—Stephen J. Novosad
Assistant Examiner—William P. Neuder
Attorney, Agent, or Firm—Charles L. Schwab

[57] ABSTRACT

A belt pulley 1 for a belt drive presenting a belt groove 3 having a transition area to the radially outer cylindrical surface 2' which is rounded at a decreasing radius. Previously, this corner was merely chamfered or rounded at a small radius, which in use led to mechanical damage to the belt placed on it. This invention provides a parabola-shaped contour for the transition area, which effectively avoids mechanical damage to the belt, wherein the largest radius RO of the transition curve is located at the later's junction with the groove face 4'.

10 Claims, 3 Drawing Figures

BELT PULLEY FOR A BELT DRIVE

TECHNICAL FIELD

This invention relates to a belt pulley for a V-belt drive.

BACKGROUND OF THE INVENTION

For many years, V-belts have functioned as strong and reliable drive elements. They are used, for instance, to power accessory units, and are used in many capacities in motor vehicles. The geometry of the V-belt must match the groove of the pulley on which used.

The width of the groove which characterizes the grooved profile is designated as the guiding width of the pulley groove and usually lies within the height of the effective zone of a drawn-up V-belt inside the pulley groove. It should normally coincide within the range of tolerance values with the effective width of the groove.

On the other hand, the reference width of the pulley groove is measured at the radially outer end of the straight laterally opposite faces of the groove as viewed in a section through the axis of the pulley. Furthermore, in the case of a multiple groove V-belt pulley, the groove spacing is a decisive dimension. In such a V-belt pulley, the groove spacing is measured from groove center to groove center of adjacent grooves of the same size.

The groove spacing may also be the minimum spacing between grooves of the same size on two individual belt pulleys in side-by-side relationship but constituting power transmitting components in two different belt drives.

In order to transfer ever greater loads, a multitude of belts have been developed for which the tension cord band, which is embedded within the height of the effective load transferring zone in order to increase the power transferring performance of a given size belt pulley, has increasingly been moved radially toward the outer surface of the belt. By such construction, the tension cord band which is embedded within the effective load transferring zone can be wider and, therefore, more efficient.

In the case of a conventional sheathed V-belt, the tension cord band is located between the rubber center and the outer diameter, and the pulley grooves are protected by an abrasion resistant mesh sheathing. In the case of an open-faced belt, the mesh sheathing is not used and therefore the belt, especially within the effective zone, can be designed to be wider. An open-face belt has an anisotropic composition. Because of the use of fibers which are aligned crosswise with respect to the run of the belt, the requirements for bending strength, on the one hand, and for a high degree of abrasion resistance along the faces as well as a high degree of cross-sectional rigidity, on the other hand, are met. Washing out of the exposed and partially cut tension fibers during use is prevented by a preparation which guarantees a secure adhesion within the embedding mixture.

The open-face belt can be cut to an exact shape and contour which leads to considerable improvement of the operational noise emission and makes it possible to individually adapt it as a pulley belt. Basically, the open-face V-belt offers the advantages of higher bending and cross-sectional strength, a lower rate of elongation, a lower rate of slipping, and higher power transfer performance. In the case of high speed belts, extremely small belts and high performance requirements, the open-face belt is significantly superior to the sheathed V-belt.

The effective power transmitting zone of the tension cord band of an open-face V-belt is located a significant distance above the reference width of a belt pulley whereby, with belt drives of equal design dimensions, a markedly higher level of power transfer can be attained because of the wider effective power transmitting zone. With a V-belt effective zone of this type, which is located radially outside the belt pulley, the edges of the pulley groove (transition from the groove faces to the cylindrical periphery surface of the belt pulley) come into contact with the belt faces. In order to avoid damage to the belt faces caused by the edges and/or, as the case may be, the transition area, the edges are customarily chamfered or rounded.

A break in the edges caused by chamfering creates new edges which can damage the belt. Rounded edges at the transition area may of necessity have a very small radius of curvature because too large a transition radius increases considerably the outer diameter of the belt pulley. Increases in a pulley diameter may make it difficult or impossible to install a V-belt because in some belt drives an adjustable tie rod for changing pulley spacing has very little adjustment, thus requiring the belt to be stretched, when, in fact, such belts can be lengthened only to a minor extent. Furthermore, a transition with a large radius of curvature also increases the overall axial dimension of the belt pulley, whereby the width of the belt drive is increased. In practice, therefore, a small radius of curvature is predominantly used at the outer end of the transition.

The forming of small radii rounded transitions of the hereinbefore mentioned type can result in trenches in the faces of the belt groove which results in considerable damage to the V-belt. Experience has shown that, after several hours operation, mechanical detachments occur in faces of the belt, which causes the belt to sink deeper into the pulley groove. When this happens, the stiff tension cord band part of the belt, which is crossways to the run of the belt, comes into power transmitting contact with the groove faces, and the belt is supported on them, whereby because of the high degree of cross-sectional resistance of the belt, the normal friction contact area of the belt, which is located beneath the tension cord band, does not contact groove faces. As a result, the tension cord band must now take on a disproportionately large part of the cross-sectional force needed to cause the V-belt to transmit the desired power. The narrow range of the effective power transmitting zone is considerably overloaded mechanically because of this. Because of the limited contact area between the belt faces and the groove faces, the belt begins to slip, wears out considerably in the process, becomes overheated and malfunctions after a short period. Furthermore, there is the danger that the tension cord band which is located in the area of the reference width will be damaged directly by the imperfect groove contour so that the power transmitting structure of the belt is destroyed.

Whenever the belt drive exhibits misalignment between the driving pulley and the driven belt pulley, belt damage caused by the imperfect contour in the transition area will result in failure of the belt after only a few hours' operation. Heretofore, in order to guarantee sufficient useful life for belt drives used for high power transmissions, the belt as well as the belt pulleys needed to be manufactured as precisely as possible and fitted to each other and assembled within a narrow range of tolerances.

OBJECT AND BRIEF DESCRIPTION OF THE INVENTION

A primary object of this invention is to provide a belt pulley which contributes to a long belt life in belt drives having high power transmission and restricted design dimensions.

The object of this invention is met by providing a transition curve between the groove face and the cylindrical outer periphery of the pulley which has an extremely large radius at the junction with the groove face whereby the usable surfaces of the groove faces are increased in the radially outer direction. The radius of curvature of the arc decreases as the curve is followed toward the outer cylindrical periphery of the pulley whereby the arc which connects to the outer cylindrical periphery has a radius which is a great deal smaller than the greatest radius of curvature of the transition curve.

In using this invention, the increase in diameter of the belt pulley is insignificant thereby permitting a high load capacity belt with a tension cord band, which can only be stretched a little, to be installed on a set of belt pulleys having little available spacing adjustment. Because of the very small radius of curvature in the transition area at the outer periphery of the belt pulley, the overall axial width of the pulley is not increased, thus permitting the width of a belt drive to be minimized. By using this invention, the groove spacing is minimized and the overall axial width of a multi-grooved belt pulley will therefore be held to a minimum.

The provision of a transition area between the groove face and the outer periphery according to this invention also affords a gentle slipping-in of the belt into the pulley groove, without causing mechanical damage to the belt faces because the transition area is free of sharp curvatures or edges. Even in the case of a belt pulley which has been subjected to misalignment, it has been shown that, because of the transition areas of this invention, an applied belt can also adjust to the misalignment over a longer period of operation without destruction to the belt faces. The high degree of exactness normally required by the present technical standards for achieving a long useful life are not necessary for a belt drive with belt pulleys made according to this invention. When using pulleys of this invention, assembly tolerances and production tolerances are allowable which would otherwise have impaired the useful life of a belt drive.

The smooth progression of the V-belt into the pulley groove which is afforded by the design of the transition of this invention is particularly advantageous in the case of drives which are affected by vibrations. If the belt is displaced outwardly by vibrations, it is gently guided back into the pulley groove by the smooth transition areas formed by the present invention without the occurrence of mechanical damage to the belt.

Even when using a transition design according to this invention, the V-belt will move radially inward into the pulley groove as wear of the belt faces occurs. In the case of a displacement of the V-belt into the pulley groove caused by normal wear, the laterally rigid effective zone is at the same time more heavily stressed during its radially inward movement on the pulley. This occurs simultaneously with a greater elastic stressing of the open belt faces, whereby a new state of equilibrium is developed. This continues over a long period of operation and guarantees a long useful life for the V-belt. In the case of drives with several V-belts next to each other in a set, a favorable "load balancing" of the individual belts with respect to each other occurs which considerably reduces the wear and tear on the entire set of belts.

An advantageous transition area is produced by continuously reducing the radius of curvature proceeding from the groove face toward the outer periphery of the pulley. The curvature of the transition area which results is smooth and guarantees smooth guiding of the belt. It may also be possible to reduce the diameter in steps and provide a satisfactory transition area.

In order to be able to manufacture a belt pulley according to this invention with modern NC-machines, it is advantageous to determine the variable radius by means of differential equations of the second order. To this end, conic section functions such as parabolas, ellipses, hyperbolas and similar configurations are expedient. The transition can be created by a transcendental, preferably a trigonometric function such as, for example, a sine function.

In a preferred example of the design, the function of the variable radius is a simple parabola of the second degree, whereby the vertex of the parabola is a point on the cylindrical peripheral surface of the belt pulley, and a branch of the parabola passes over into the groove surface in the area of the reference width of the pulley groove. In actual use, pulleys of this invention have contributed to longer useful life for belt drives.

BRIEF DESCRIPTION OF THE DRAWINGS

One embodiment of the invention is illustrated in the drawings in which.

DETAILED DESCRIPTION OF THE DRAWINGS

Figure 1:
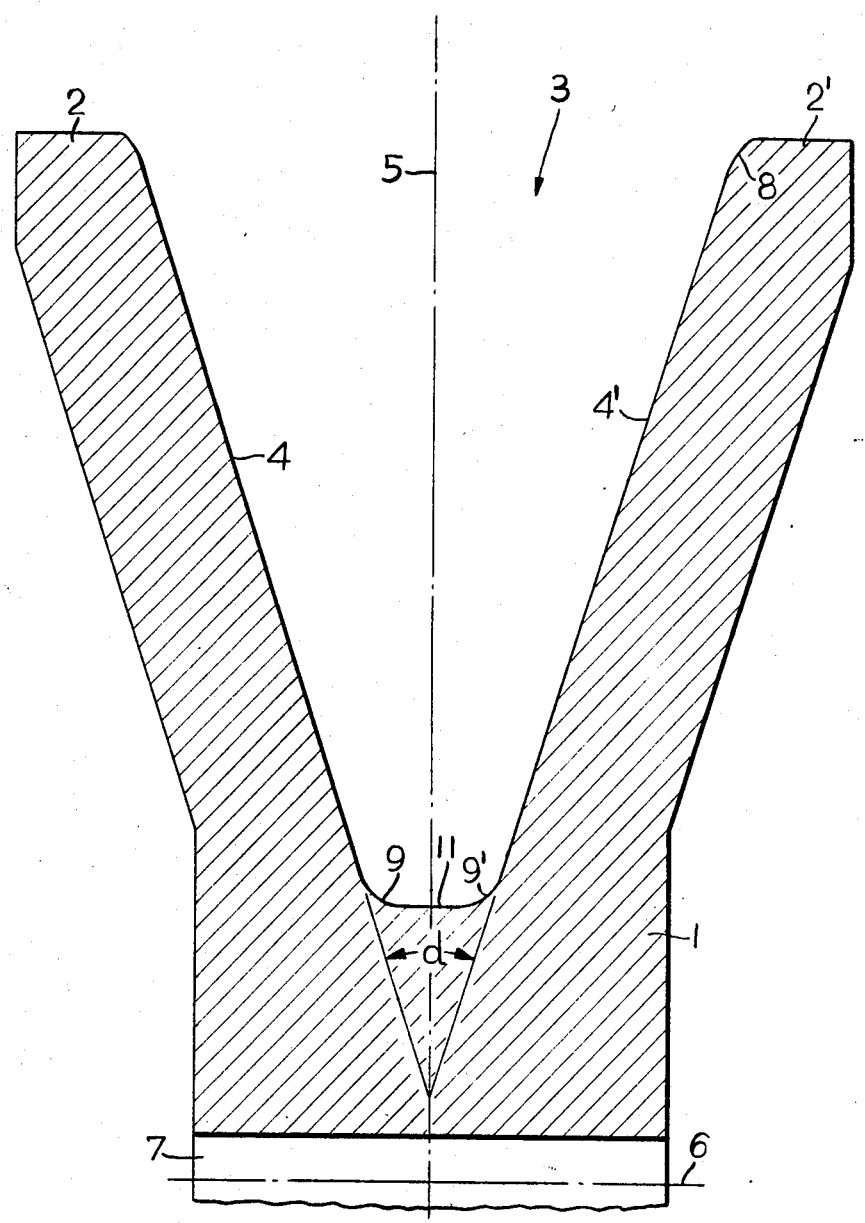
FIG. 1 is a partial section of a belt pulley.

Referring to FIG. 1, a belt pulley includes a cylindrical body 1 with a pair of equal diameter and radially outward facing cylindrical surfaces 2, 2' which are the radially outermost or peripheral surfaces of the belt pulley and thus are the surfaces over which a belt is moved when it is placed in the radially outward open belt groove 3. The generally V-section annular groove 3 has radially outwardly diverging conical faces 4, 4', the radially outer edges of which join the coaxial cylindrical surfaces 2, 2'. A radial plane 5 bisects the angle d which is the angle of divergence of the cones defined by the conical surfaces 4, 4'. The centerline or axis 6 of the belt pulley 1 is perpendicular to the radial plane 5. The belt pulley 1 has a central annular opening 7 on the axis 6 for connecting the pulley 1 to a shaft, not shown, of the belt drive. The opening 7, the cylindrical surfaces 2, 2' and the conical faces 4, 4' are coaxial.

The basic body of the belt pulley 1 is fabricated, in the illustrated embodiment of the invention, in one piece of gray cast iron. The belt groove 3 is formed by means of mechanical machining. It may be advantageous in some applications of the invention to make the basic body from two identical stampings which are joined together at the radial plane 5 by suitable means, not shown.

Figure 2:
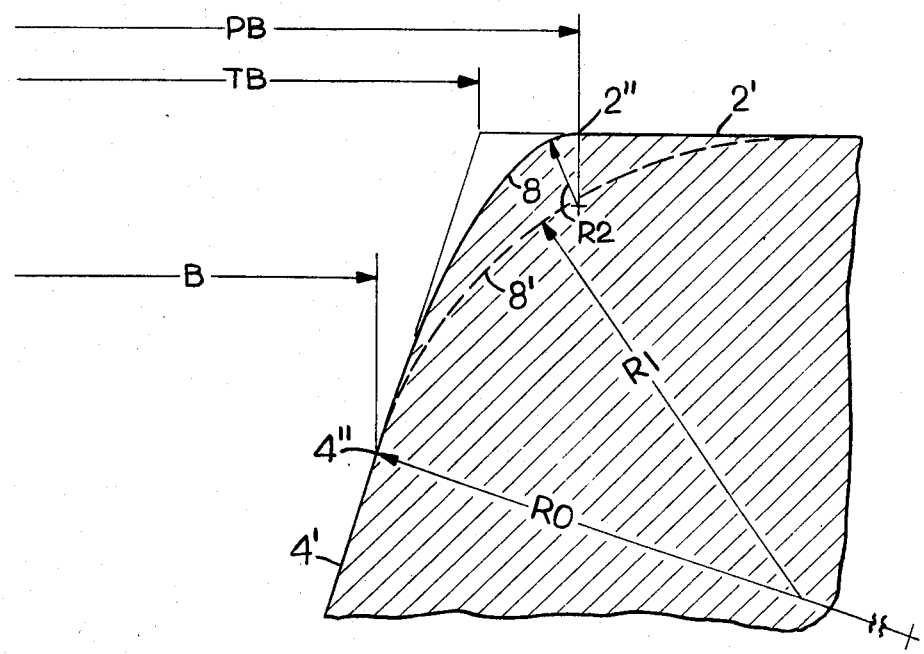
FIG. 2 is an enlarged partial section of the belt pulley showing a radially outer transition curve of the belt groove.

The belt groove 3 of the belt pulley 1 is determined by the following referential dimensions shown in FIG. 2, which is a part of a section taken on a plane through the axis 6. The reference width B of the pulley groove 3 is measured at the radially outer end 4" of the conical groove face 4' at its connection with a rounded transition 8 (formed by rotating half a parabola about the axis 6). The theoretical groove width TB is measured from the theoretical intersection point of the lengthened groove face 4' with an axially extended cylindrical surface 2'. The practical or actual groove width PB is measured from the connecting point 2" of the transition curve 8 with the cylindrical surface 2'.

As is shown in FIG. 2, the transition curve 8 is formed with a variable radius from the radially outer end 4" of the conical groove face 4' to the connecting point 2" with the cylindrical outer surface or periphery 2' of the belt pulley 1. The portion of the transition curve 8 which connects to the groove face 4' has a greater radius of curvature R0 than the portion of the transition curve 8 which connects with the outer cylindrical surface 2' of the belt pulley. The radius R2 provided in connecting the transition curve 8 to the point 2" is several times smaller than radius R0. Preferably, the radius of the transition curve 8 changes continously from point end 4" to the connecting point 2" so that a continuously smooth transition curve 8 is formed. The transition curve 8 can be formed from a series of connected curve segments from point 4" to point 2"; however, such a design would not produce a curve with a continuously changing radius.

If a constant radius such as R1 is used to produce a transition curve, shown in FIG. 2 by broken lines 8' between the surfaces 4" and 2", it would be a much smaller radius than the radius R0 of the curve 8 near point 4". If the transition area is formed with a constant radius R1, the useful surface of the groove face 4', to a substantial extent, ends at the transition point 4" and the overall axial width of a belt pulley with such a groove is considerably greater than a pulley constructed according to the present invention. However, by using the rounded transition 8 of this invention, the usable surface area of groove face 4' is extended radially outward a considerable distance beyond the transition point 4"', whereby the belt engages a surface area which extends radially outward and thus provides greater power transmitting capability. Furthermore, with the transition area 8 formed according to this invention, the groove spacing to the adjacent groove (in the case of multigrooved belt pulleys) and the overall axial width of belt pulley 1 can be designed considerably smaller than when using a rounded transition 8' with a constant radius of curvature R1, which amounts to only a fraction of the radius of curvature R0.

In a preferred embodiment of the invention, the radius is determined according to a differential equation of the second order whereby the belt pulley can be machined with an NC-machine tool without difficulty. A mathematical function of this type is, preferably, a conic section function, such as a parabola, a hyperbola, an ellipse, etc. It is also believed possible to use a transcendental function, preferably a trigonometric function such as a sine function.

The contour of the disk groove designed according to this invention can be achieved through the vectorial combination of two fundamental movements of the cutting tool. In forming the groove, the cutting tool moves at a constant speed in the direction of an X coordinate and at an evenly accelerated speed in the direction of the Y coordinate from zero to a specified limit value. In doing so, the X coordinate runs in the direction of the axis 6, while the Y coordinate runs in the direction of the plane of symmetry 5.

In accordance with the preferred embodiment of the invention, the mathematical function according to which the radius of the transition curve changes is a simple parabola of the second degree. The vertex of the parabola is located at the connecting point 2" at the radially outer cylindrical surface 2' of pulley 1. If a reduction of the radial dimension of the belt pulley should be necessary, the vertex of the parabola can also be located radially outward of the cylindrical outer surface of the belt pulley. In a very smooth transition, the parabolic branch passes over to the groove face 4' at point 4" which is at the reference width B. With a transition area of this type, the pulley groove 3 with a radially extended belt engaging surface is formed, which provides a groove width in the transition area which is closer to the theoretical groove width TB than the prior art transition area 8' formed with a constant radius 8'. Preferably, in a given design pulley, the radius of curvature R0 at the groove face 4' is at least four times greater than radius R1 of curvature 8'. In other words, the radius of curvatures R0 is at least four times greater than the radius of a circle to which the groove face 4' is tangential at the junction 4" and to which the cylindrical surface 2' is tangential.

Figure 3:
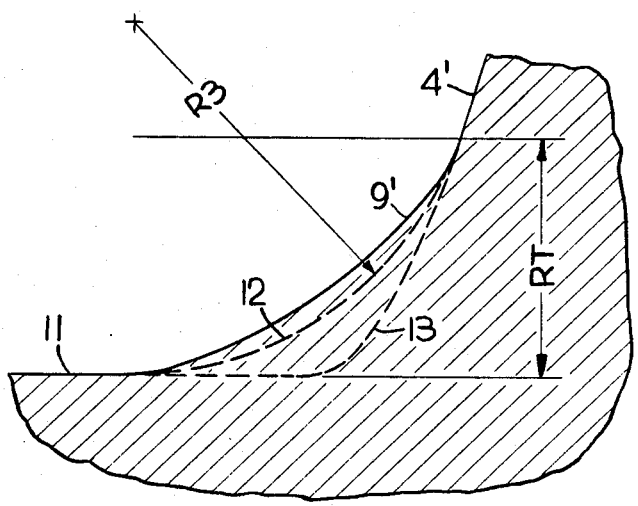
FIG. 3 is an enlarged partial section of the belt pulley showing a radially inner transition curve at the bottom of the belt groove.

It may also be advantageous to form transition areas at the bottom 11 of the groove 5 having curves 9, 9" which are also designed with a variable radius of curvature. The transition curves 9, 9" of the bottom of the groove 3 can be formed by an NC-machine tool controlled by a mathematical function of the second degree. The transition curve shown by broken lines 12 in FIG. 3 with a radius R3 shows a normal constant radius curve. The curve 9' and the curve represented by broken line 13 are transition curves formed with an NC-machine tool, wherein the movement of the cutting tool is determined by a vectorial combination of movements in X and Y directions. In machining the curve 9', the cutting tool is moved at a constant speed in the Y direction and is accelerated in the X direction. The transition curve 13 is formed by a vectorial combination of an accelerated movement in the Y direction and a constant movement of the cutting tool in the X direction.

. The embodiments of the invention in which an exclusive property or privilege is claimed are defined as follows.

1. A belt pulley for a belt drive having an annular body and at least one radially outwardly open belt receiving groove defined by conically shaped inner faces which diverge radially outwardly relative to one another to form a groove angle bisected by a plane perpendicular to the axis of said pulley, each of said faces being joined to a radially outer annular peripheral surface of said body by a curved transition area with that part of the transition area which connects to the associated face having a greater radius of curvature than that part of the transition are a which connects with the radially outer annular peripheral surface.

2. The belt pulley of claim 1, wherein the radius of said transition area, proceeding radially outward from the groove face, decreases continuously.

3. The belt pulley of claim 1, wherein the radius of said transition area decreases as measured proceeding radially outward from the groove face.

4. The belt pulley of claim 1, wherein the curvature of said transition area is determined in accordance with a mathematical function of the second degree.

5. The belt pulley of claim 4, wherein said function is a transcendental function.

6. The belt pulley of claim 4, wherein said function is a sine function.

7. The belt pulley of claim 4, wherein said mathematical function defines a parabola.

8. The belt pulley of claim 7, wherein the vertex of said parabola lies near said annular periphery of said belt pulley and wherein one branch of said parabola makes a smooth junction with the associated face of said groove.

9. The belt pulley of claim 8, wherein said annular peripheral surface is cylindrical and said vertex is at said cylindrical peripheral surface.

10. The belt pulley of claim 1 wherein said annular peripheral surface is cylindrical and wherein the radius of curvature of said transition area at its junction with said groove face is at least four times greater than the radius of a circle tangential to said groove face at said junction and tangential to said cylindrical peripheral surface.

* * * * *